US012662057B2

(12) United States Patent　(10) Patent No.:　US 12,662,057 B2
Grein et al.　(45) Date of Patent:　Jun. 23, 2026

(54) RACK SYSTEM FOR A CARGO SPACE OF A COMMERCIAL VEHICLE

(71) Applicant: Ford Global Technologies, LLC, Dearborn, MI (US)

(72) Inventors: Marcel Grein, Geilenkirchen (DE); Jeroen Lem, Wittem (NL); Ilya Popov, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 458 days.

(21) Appl. No.: 18/372,956

(22) Filed: Sep. 26, 2023

(65) Prior Publication Data

US 2024/0109495 A1　Apr. 4, 2024

(30) Foreign Application Priority Data

Oct. 4, 2022　(DE) .......................... 102022125462.3

(51) Int. Cl.
　B60R 5/00　(2006.01)
　B60P 1/64　(2006.01)
　　　(Continued)

(52) U.S. Cl.
　CPC ........... B60R 5/006 (2013.01); B60P 1/6427 (2013.01); B60P 1/649 (2013.01); B65G 1/026 (2013.01);
　　　(Continued)

(58) Field of Classification Search
　CPC .......... B60R 5/006; B60R 5/04; B60R 5/041; B60R 7/02; B60R 2011/0003;
　　　(Continued)

(56) References Cited

U.S. PATENT DOCUMENTS

| 4,627,542 | A | 12/1986 | Fredrickson |
| 4,705,315 | A | 11/1987 | Cherry |
| 6,308,873 | B1 | 10/2001 | Baldas et al. |
| 8,776,778 | B1 | 7/2014 | Brown |

(Continued)

FOREIGN PATENT DOCUMENTS

| DE | 29800888 U1 | 3/1998 |
| DE | 102016010687 A1 | 3/2018 |

(Continued)

OTHER PUBLICATIONS

Translation DE-102018001734-A1 (year 2019).*

*Primary Examiner* — Amy R Weisberg
*Assistant Examiner* — Denise Lynne Esquivel
(74) *Attorney, Agent, or Firm* — Vichit Chea; Price Heneveld LLP

(57)　　ABSTRACT

A rack system for a cargo space of a commercial vehicle is provided having a rack with at least one shelf and a movement device for moving the rack between a transport position, in which the rack can be arranged completely in the cargo space, and an access position, in which the rack can be arranged at least partially outside the cargo space. In order to provide a rack system which can be used more efficiently in respect of available cargo space, the rack system has a receiving unit for at least partially receiving at least one cargo item which can be arranged in the rack, wherein the receiving unit is arranged on the shelf so as to be displaceable in a depth direction of the rack.

18 Claims, 5 Drawing Sheets

(51) Int. Cl.
| | |
|---|---|
| *B65G 1/02* | (2006.01) |
| *B60P 3/00* | (2006.01) |
| *B60P 7/10* | (2006.01) |
| *B60R 11/00* | (2006.01) |
| *B65G 1/12* | (2006.01) |

(52) U.S. Cl.
CPC ................. *B60P 3/007* (2013.01); *B60P 7/10* (2013.01); *B60R 2011/0003* (2013.01); *B65G 1/12* (2013.01)

(58) Field of Classification Search
CPC ............ B60R 2011/0084; B60R 11/06; B62D 33/046; B60P 1/00; B60P 1/6418; B60P 1/6427; B60P 1/649; B60P 7/10; B60P 7/13; B60P 3/007; B65G 1/026; B65G 1/10; B65G 1/12; B65G 67/02
USPC ................ 296/37.6; 410/32, 66, 77, 80, 92; 414/467
See application file for complete search history.

(56) References Cited

U.S. PATENT DOCUMENTS

| | | | | |
|---|---|---|---|---|
| 8,925,777 | B1 * | 1/2015 | Casucci | ................. B60R 9/065 224/404 |
| 9,713,977 | B1 * | 7/2017 | Neal | ..................... B60P 1/4442 |
| 12,473,149 | B1 * | 11/2025 | Brady | ..................... B60P 3/007 |
| 2004/0207226 | A1 | 10/2004 | Johnson | |
| 2014/0054339 | A1 | 2/2014 | Smith | |
| 2022/0281534 | A1 | 9/2022 | Reed et al. | |
| 2023/0143630 | A1 * | 5/2023 | Cieszkowski, III | .... B60P 3/007 296/24.36 |
| 2023/0191923 | A1 * | 6/2023 | Kazyak | ................... B60L 53/14 180/68.5 |

FOREIGN PATENT DOCUMENTS

| | | | |
|---|---|---|---|
| DE | 102019000895 A1 | 8/2019 | |
| DE | 102018001734 A1 * | 9/2019 | ............. B60P 3/007 |
| DE | 2020019005719 U1 | 9/2021 | |
| EP | 2157884 B1 | 8/2013 | |

* cited by examiner

RACK SYSTEM FOR A CARGO SPACE OF A COMMERCIAL VEHICLE

CROSS-REFERENCE TO RELATED APPLICATION

This application claims foreign priority benefits under 35 U.S.C. § 119(a)-(d) to German Application No. 102022125462.3 filed Oct. 4, 2022, which is hereby incorporated by reference in its entirety.

FIELD OF THE DISCLOSURE

The present disclosure generally relates to a rack system for a cargo space of a commercial vehicle, and more particularly relates to a vehicle rack system having a rack with a shelf and a movement device for moving the rack between a transport position, in which the rack can be or is arranged completely in the cargo space, and an access position, in which the rack can be or is arranged at least partially outside the cargo space.

BACKGROUND OF THE DISCLOSURE

Cargo spaces of commercial vehicles, such as delivery vehicles or tradesman's vehicles, are often equipped with racks that are used to store and/or transport objects and, at the same time, help to keep order in the cargo space. Due to the common presence of objects on the floor of the cargo space and the space required for loading and unloading, it may not always be possible to get access to the entire rack.

It would be desirable to provide a rack system for the cargo space that can be used more efficiently with respect to available cargo space of a commercial vehicle.

SUMMARY OF THE DISCLOSURE

According to a first aspect of the present disclosure, a rack system for a cargo space of a vehicle includes a rack, a shelf supported on the rack, a movement device for moving the rack between a transport position, in which the rack can be arranged completely in the cargo space, and an access position, in which the rack can be arranged at least partially outside the cargo space, and a receiving unit for at least partially receiving at least one cargo item which can be arranged in the rack, wherein the receiving unit is arranged on the shelf so as to be displaceable in a depth direction of the rack.

Embodiments of the first aspect of the present disclosure can include any one or a combination of the following features:

a displacement wedge arranged at a fixed location on the vehicle and arranged relative to the rack such that, when the rack is moved from the transport position into the access position, the receiving unit inevitably comes into contact with the displacement wedge such that the receiving unit is displaced in a direction of an access side of the rack by the displacement wedge;

a return mechanism, for which the receiving unit which has been displaced toward the access side of the rack can be subjected to a restoring force in a direction of a rear side of the rack;

the return mechanism has at least one return spring, which is supported on the receiving unit and on the shelf;

a locking mechanism, which is activated by the displacement of the receiving unit to the access side of the rack and deactivated by the displacement of the receiving unit to the rear side of the rack;

the locking mechanism has a locking element, which is preloaded in the direction of a locking position, a locking opening, which is formed in the shelf and in which the locking element situated in the locking position engages, and a release element for releasing the locking element situated in the locking position;

a rail guide, connected to the receiving unit and the shelf, for displacing the receiving unit relative to the shelf;

the receiving unit has a base, two side walls, which laterally delimit a receiving space and extend in the depth direction of the rack, and a rear wall, which connects the side walls to one another;

an electric-motor adjusting device for displacing the receiving unit relative to the shelf; and/or the rack system is for the cargo space on a commercial vehicle.

According to a second aspect of the present disclosure, a rack system for a cargo space of a commercial vehicle includes a rack, a shelf supported on the rack, a movement device for moving the rack between a transport position, in which the rack can be arranged completely in the cargo space, and an access position, in which the rack can be arranged at least partially outside the cargo space, a receiving unit for at least partially receiving at least one cargo item which can be arranged in the rack, wherein the receiving unit is arranged on the shelf so as to be displaceable in a depth direction of the rack, a displacement wedge arranged at a fixed location on the commercial vehicle and arranged relative to the rack such that, when the rack is moved from the transport position into the access position, the receiving unit inevitably comes into contact with the displacement wedge such that the receiving unit is displaced in a direction of an access side of the rack by the displacement wedge, and a return mechanism, for which the receiving unit which has been displaced toward the access side of the rack can be subjected to a restoring force in a direction of a rear side of the rack.

Embodiments of the second aspect of the present disclosure can include any one or a combination of the following features:

the return mechanism has at least one return spring, which is supported on the receiving unit and on the shelf;

a locking mechanism, which is activated by the displacement of the receiving unit to the access side of the rack and deactivated by the displacement of the receiving unit to the rear side of the rack;

the locking mechanism has a locking element, which is preloaded in the direction of a locking position, a locking opening, which is formed in the shelf and in which the locking element situated in the locking position engages, and a release element for releasing the locking element situated in the locking position;

a rail guide, connected to the receiving unit and the shelf, for displacing the receiving unit relative to the shelf;

the receiving unit has a base, two side walls, which laterally delimit a receiving space and extend in the depth direction of the rack, and a rear wall, which connects the side walls to one another; and/or an electric-motor adjusting device for displacing the receiving unit relative to the shelf.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
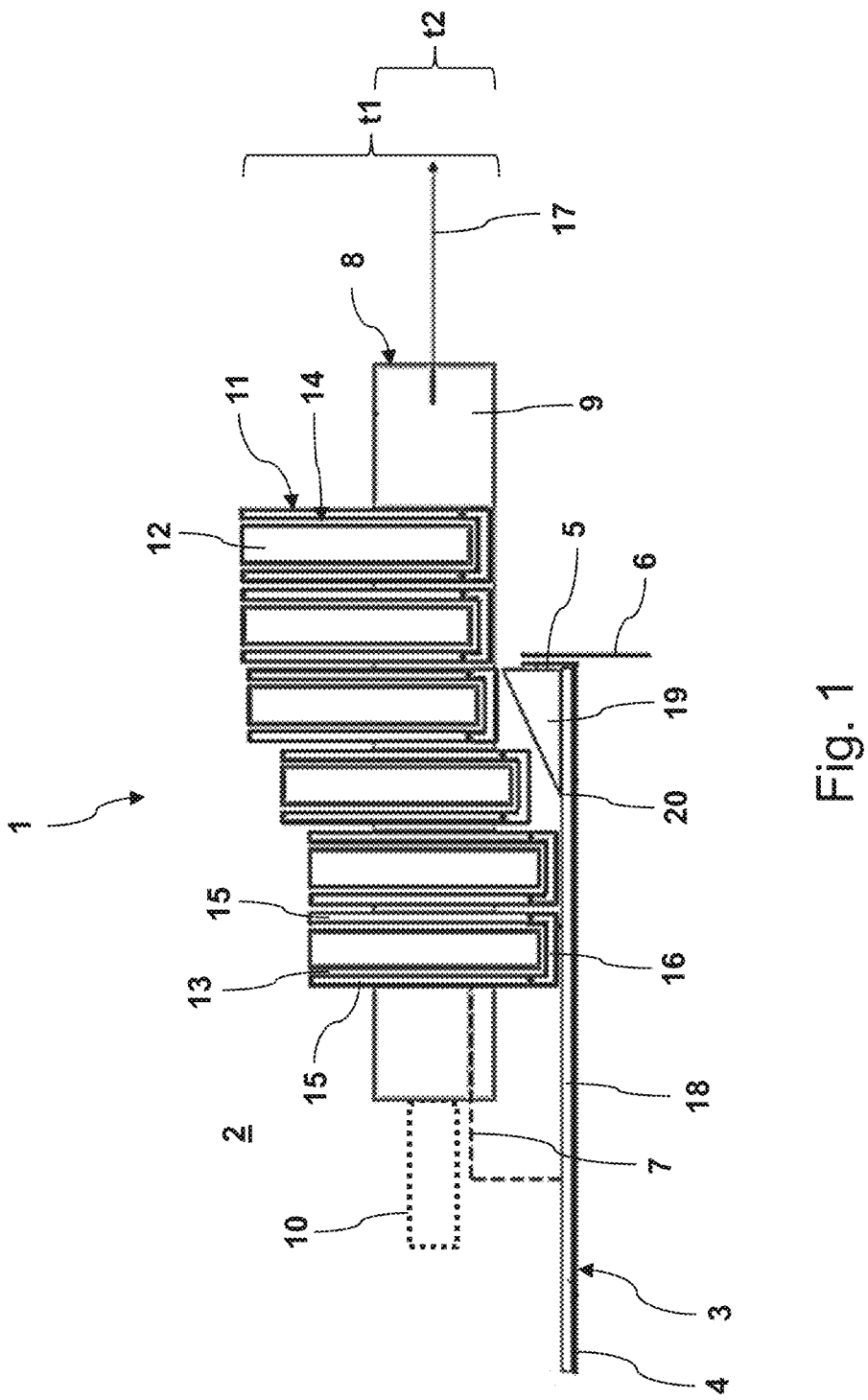
FIG. 1 is a schematic plan view of one exemplary embodiment of a rack system for a cargo space of a commercial vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a rack system for a cargo space of a commercial vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the different figures, identical parts are provided with the same reference signs, for which reason they are generally described once.

FIG. 1 shows a schematic plan view of one exemplary embodiment of a rack system 1 according to one embodiment for a cargo space 2 of a commercial vehicle 3. The commercial vehicle 3 is illustrated having a side wall 4 of the cargo space 2, a rear wall section 5, which laterally delimits a rear loading opening (not shown) of the cargo space 2 and is connected to the side wall 4 at the rear, and a rear door 6, which is shown in an open position. In addition, a wheel arch 7 is indicated by a dashed line.

The rack system 1 has a rack 8 with a shelf 9. In addition, the rack system 1 has a movement device 10 (indicated by a dashed line) for moving the rack 8 between a transport position, in which the rack 8 is arranged completely in the cargo space 2, and an access position, in which the rack 8 is arranged at least partially outside the cargo space 2. In FIG. 1, the rack 8 is shown in an intermediate position, through which the rack 8 passes during a movement from the transport position into the access position, wherein, in the intermediate position, the rack 8 is already arranged partially outside the cargo space 2 at the rear.

In addition, the rack system 1 has, by way of example, six receiving units 11 for at least partially receiving in each case at least one cargo item 12 arranged in the rack 8. Cargo items may include large items, such as toolboxes, for example. Each receiving unit 11 has a base 13, two side walls 15, which laterally delimit a receiving space 14 and extend in the depth direction of the rack 8, and a rear wall 16, which connects the side walls 15 to one another. In this case, each receiving unit 11 is designed to be open to an access side of the rack 8, the access side shown situated at the top in FIG. 1. Each receiving unit 11 has a depth t1, which is approximately twice the depth t2 of the shelf 9.

Each receiving unit 11 is arranged on the shelf 9 so as to be displaceable in a depth direction of the rack 8. In FIG. 1, the two receiving units 11 shown on the left are shown in a transport setting, in which these receiving units 11 protrude from the rear of the rack 8 and are supported indirectly on the side wall 4 in order to make effective use of the space between the shelf 9 and the side wall 4. On the other hand, the three receiving units 11 shown on the right in FIG. 1 have been displaced in the direction of a longitudinal central axis (not shown) of the commercial vehicle 3 and are therefore situated in access settings, in which they are arranged flush with a rear side of the shelf 9. As a result, these three receiving units 11 can pass the wall section 5 without making contact when the rack 8 is moved in accordance with the direction indicated by arrow 17. The third receiving unit 11 from the left in FIG. 1 is shown in an intermediate setting, which lies between the transport setting and the access setting. To prevent the receiving units 11 situated in their transport settings from scraping on the side wall 4 during a movement of the rack 8, the rack system 1 has a sliding element 18, which is arranged on the side wall 4 and extends over most of the width of the side wall 4 or over its entire length.

In addition, the rack system 1 has a displacement wedge 19, which can be arranged at a fixed location on the commercial vehicle 3 and is arranged relative to the rack 8 in such a way that, when the rack 8 is moved from the transport position into the access position, the respective receiving unit 11 inevitably comes into contact with the displacement wedge 19 in such a way that the receiving unit 11 is displaced in the direction of the access side of the rack 8 or in the direction of the longitudinal central axis of the commercial vehicle 3 by use of the displacement wedge 19. The wedge tip 20 of the displacement wedge 19 faces a front (not shown) of the commercial vehicle 3. The displacement wedge 19 is arranged in the cargo space 2 directly adjacent to the wall section 5 and forms a ramp. The displacement wedge 19 can be fastened to the side wall 4 and/or to the wall section 5.

For each receiving unit 11, the rack system 1 has a dedicated return mechanism (not shown in FIG. 1), by use of which the respective receiving unit 11 which has been displaced to the access side of the rack 8 can be subjected to a restoring force in the direction of a rear side of the rack 8 (shown at the bottom in FIG. 1). One exemplary embodiment of the return mechanism is shown in FIGS. 3a and 3b and 4a and 4b. The return mechanism shown there has a return spring, which is supported on the receiving unit 11, on the one hand, and on the shelf 9, on the other hand.

In addition, the rack system 1 has a dedicated locking mechanism 23 (not shown in FIG. 1) for each receiving unit 11. The locking mechanism can be activated by the displacement of the respective receiving unit 11 to the access side of the rack 8 and can be deactivated by the displacement of the receiving unit 11 to the rear side of the rack 8. One exemplary embodiment of the locking mechanism 23 is shown in FIGS. 3a and 3b and 5a and 5b.

As an alternative to the return mechanism and the locking mechanism, the rack system 1 can have a dedicated electric-motor adjusting device (not shown) for each receiving unit 11 in order to displace the respective receiving unit 11 relative to the shelf 9.

Furthermore, for each receiving unit 11, the rack system 1 has a rail guide (not shown in FIG. 1) for displacing the receiving unit 11 relative to the shelf 9, which rail guide is connected to the respective receiving unit 11 and the shelf 9. An exemplary embodiment of the rail guide is shown in FIG. 3.

Figure 2:
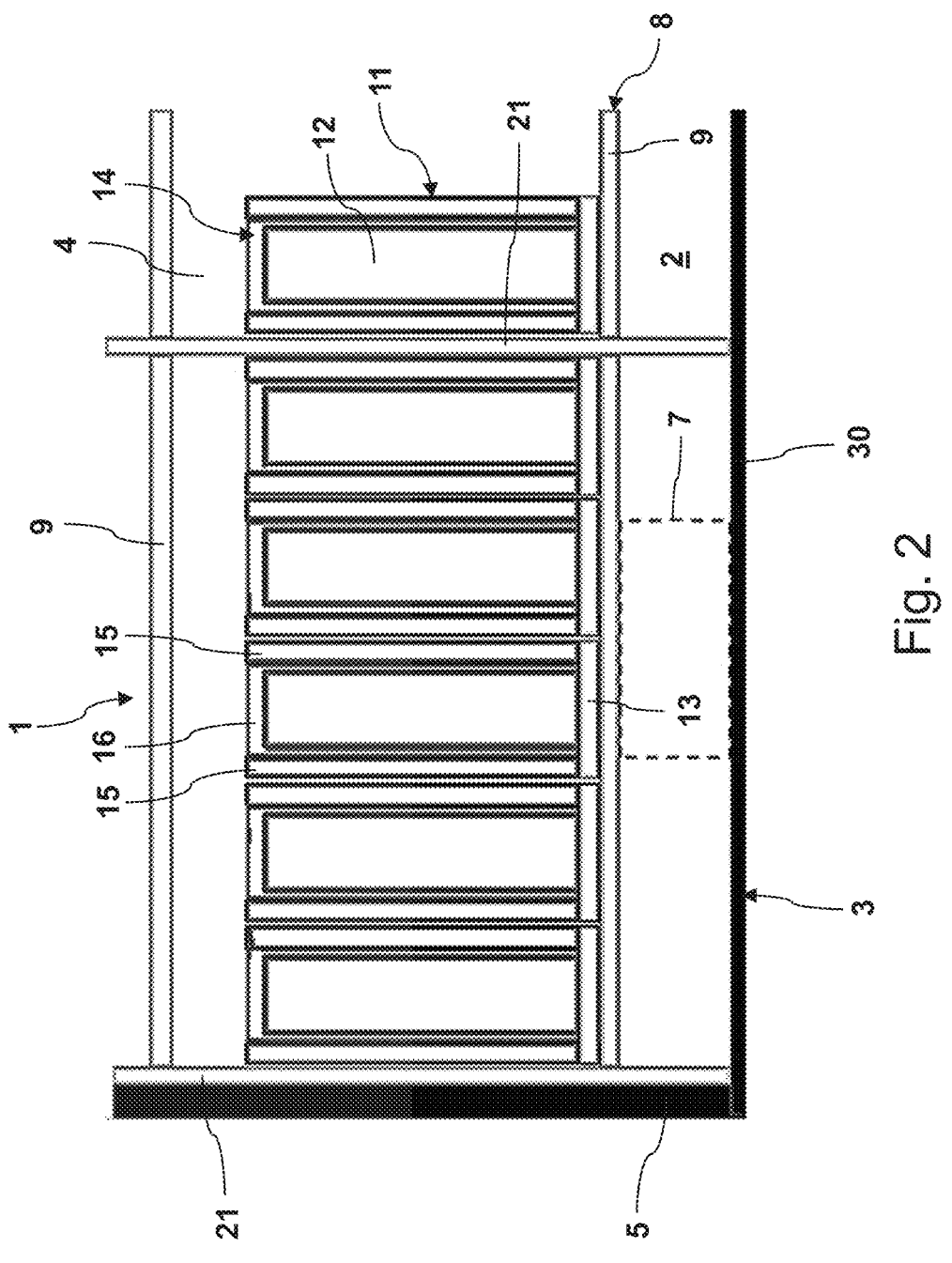
FIG. 2 is a schematic side view of the rack system shown in FIG. 1.

FIG. 2 shows a schematic side view of the rack system 1 shown in FIG. 1. A loading floor 30 of the cargo space 2 is shown. In addition, two vertical rack elements 21 and two shelves 9 of the rack 8, which are arranged vertically one above the other, are shown, wherein receiving units 11 are arranged only on the lower shelf 9. The lower shelf 9 is arranged above the wheel arch 7. The rack 8 is shown in its transport position, in which it is arranged completely within the cargo space 2.

Figure 3B:
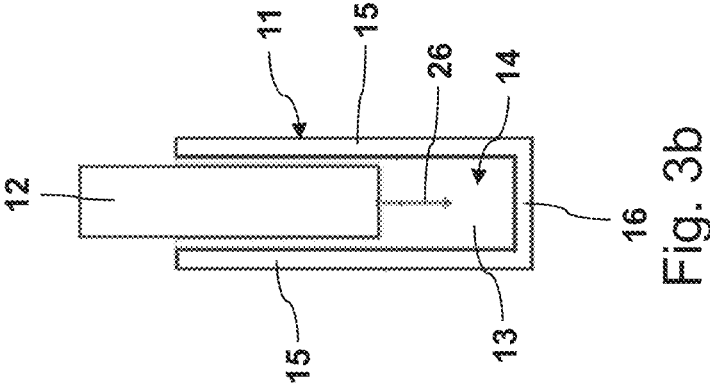
FIG. 3b is a schematic plan view of a receiving unit during the introduction of a cargo item into the receiving unit.
Figure 3A:
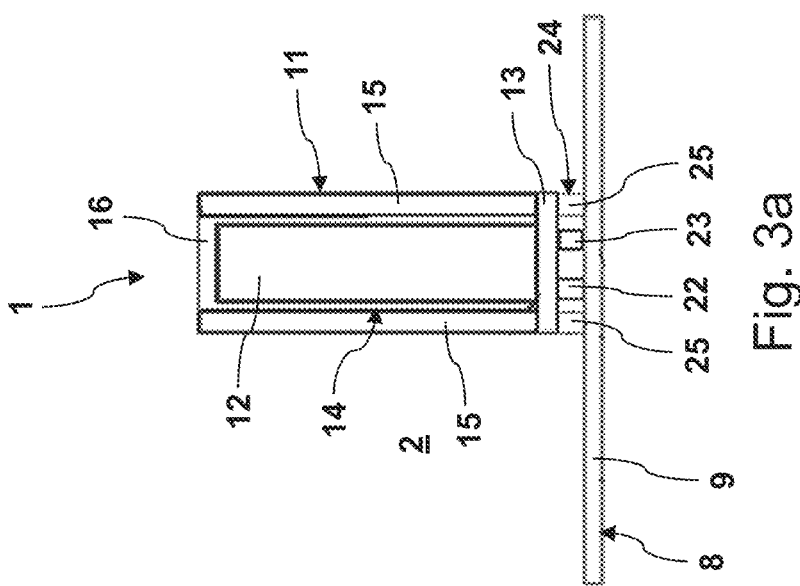
FIG. 3a is a schematic side view of details of the rack system shown in FIGS. 1 and 2.

FIG. 3a shows a schematic side view of details of the rack system 1 shown in FIGS. 1 and 2. Only the shelf 9 with a receiving unit 11 arranged thereon is shown in FIG. 3a.

Figures 4A, 4B:
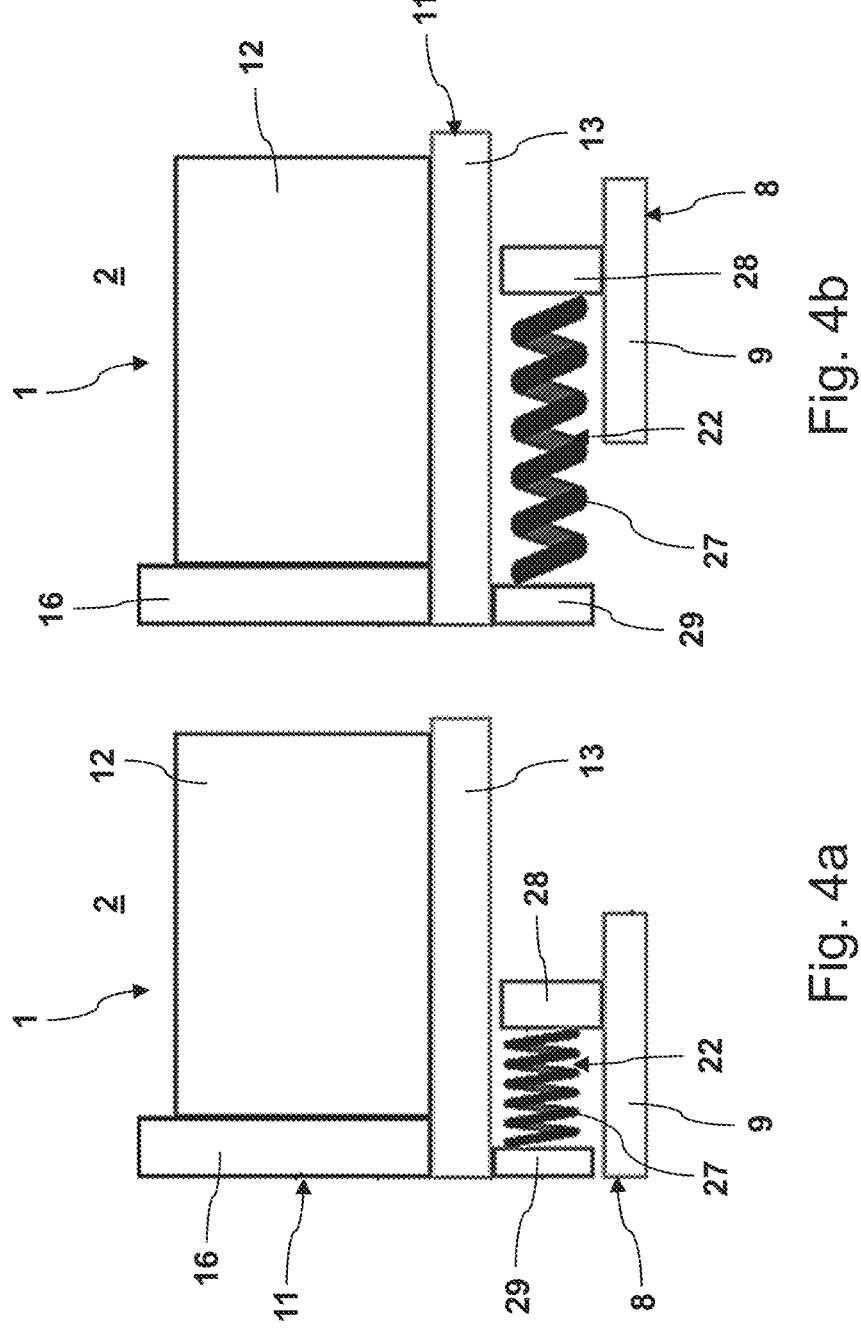
FIG. 4a is a schematic view of details of the rack system shown in FIGS. 3a-3b with a return spring in a compressed state.
FIG. 4b is a schematic view of details of the rack system shown in FIG. 4a with the return spring in a tensioned state.

For the receiving unit 11, the rack system 1 has a dedicated return mechanism 22, by use of which the receiving unit 11 which has been displaced to the access side of the rack 8 can be subjected to a restoring force in the direction of the rear side of the rack 8. An exemplary embodiment of the return mechanism is shown in FIGS. 4a and 4b.

Figures 5A, 5B:
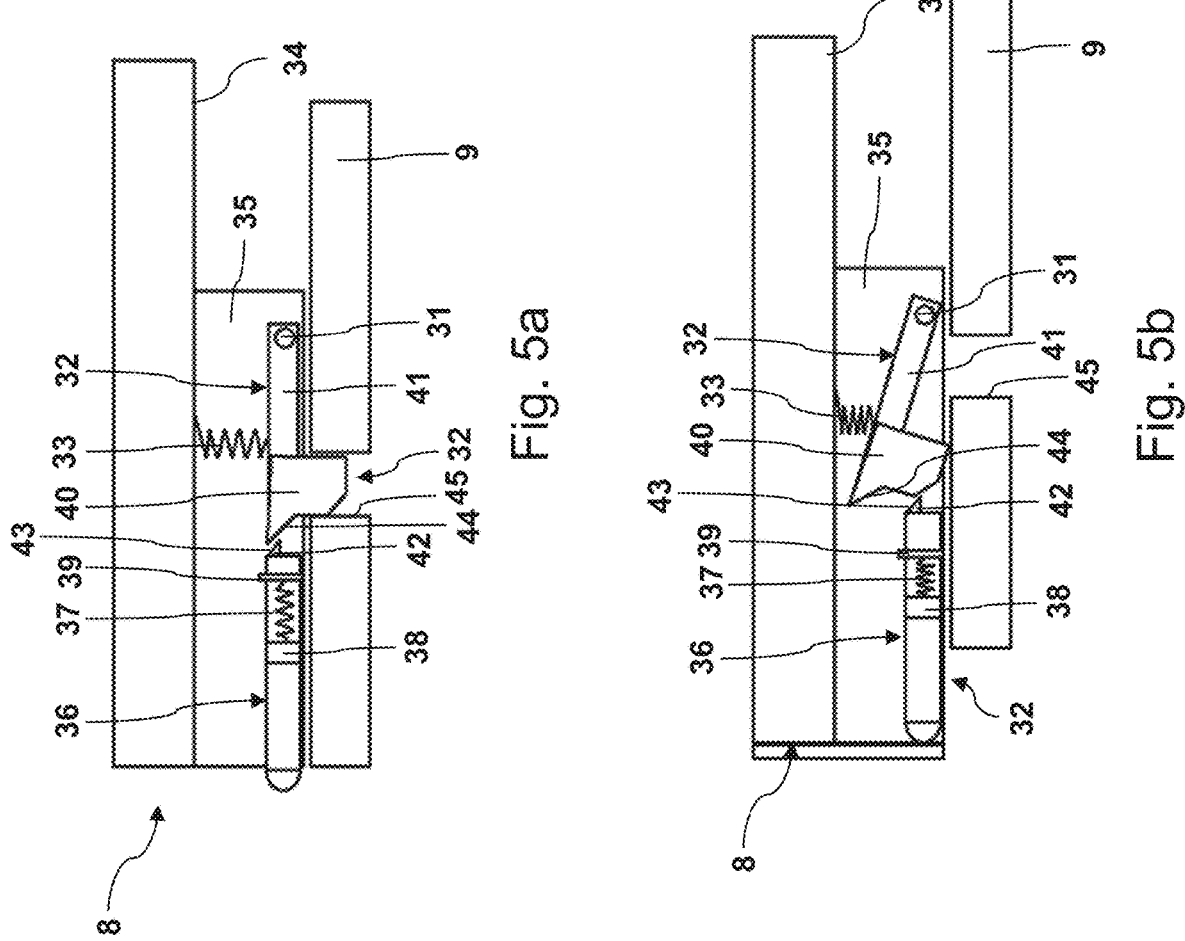
FIG. 5a is a schematic view of the rack system shown in FIGS. 3a and 3b with the rack in the access position.
FIG. 5b is a schematic view of the rack system shown in FIGS. 3a and 3b, with the rack in the transport position.

In addition, the rack system 1 has a dedicated locking mechanism 23 for the receiving unit 11. The locking mechanism can be activated by the displacement of the receiving unit 11 to the access side of the rack 8 and can be deactivated by the displacement of the receiving unit 11 to the rear side of the rack 8. An exemplary embodiment of the locking mechanism is shown in FIGS. 5a and 5b.

Furthermore, the rack system 1 has a rail guide 24 for the receiving unit 11, for displacing the receiving unit 11 relative to the shelf 9. The rail guide is connected to the respective receiving unit 11 and the shelf 9 and has two guide rails 25 arranged parallel to one another and extending in the depth direction of the rack 8. A displacement device is thus expediently formed by the rail guide 24 and the associated guide rails 25.

FIG. 3b shows a schematic plan view of a receiving unit 11 during the introduction of a cargo item 12 into the receiving unit 11 in the direction in accordance with arrow 26. It can be seen that the receiving unit 11 is designed to be open to the access side of the rack 8 as well as at the top.

FIGS. 4*a* and 4*b* show two schematic views of details of the rack system shown in FIGS. 3*a* and 3*b*. In FIGS. 4*a* and 4*b*, on the left, a state of the rack system 1 is shown in which the receiving unit 11 shown is in its access setting, while in FIGS. 4*a* and 4*b*, on the right, a state of the rack system 1 is shown in which the receiving unit 11 shown is in its transport setting.

FIGS. 4*a* and 4*b* also shows an exemplary embodiment of the return mechanism 22 shown in FIGS. 3*a* and 3*b*. The return mechanism 22 has a return spring 27 designed as a helical spring, which is supported, on the one hand, on the shelf 9 via a spring holding element 28 connected to the shelf 9 and, on the other hand, on the receiving unit 11 via a spring holding element 29 connected to the base 13 of the receiving unit 11.

As shown in FIG. 4, the return spring 27 is compressed or tensioned when the receiving unit 11 is in its access setting, in order to generate the restoring force described above. On the other hand, the return spring 27 is very largely relaxed when the receiving unit 11 is in its transport setting.

FIGS. 5*a* and 5*b* shows a schematic view of details of the rack system 1 shown in FIGS. 3*a* and 3*b*. In particular, an exemplary embodiment of the locking mechanism 23 is shown. In FIG. 5*a*, the rack 8 is shown in the access position, while, in FIG. 5*b*, the rack 8 is shown in the transport position.

The locking mechanism 23 has a locking element 32 arranged on a receiving unit 11 so as to be pivotable about a pivot 31. The pivot 31 is perpendicular to the plane of the drawings of FIGS. 5*a* and 5*b*, runs parallel to a direction of movement of the rack 8, and runs perpendicular to a direction of movement of the receiving unit 11, which can be moved in the left-right direction in FIG. 1. The locking element 32 is preloaded by use of a spring element 33 of the locking mechanism 23 from a release position shown in FIG. 5*b* in the direction of a locking position shown in FIG. 5*a*. For this purpose, the spring element 33 is supported, on the one hand, on the locking element 32 and, on the other hand, on an underside 34 of the receiving unit 11. In addition, a guide section 35 of the receiving unit 11, on which guide section the locking element 32 is pivotably mounted, is arranged on the underside 34 of the receiving unit 11. The further construction of the locking element 32 and how it functions will be described further below.

In addition, the locking mechanism 23 has a release element 36, which is arranged so as to be movable relative to the receiving unit 11, parallel to the direction of movement of the receiving unit 11. For this purpose, the release element 36 is arranged in a linearly movable manner on the guide section 35 of the receiving unit 11. The release element 36 is preloaded by a further spring element 37 of the locking mechanism 23 from a release position shown in FIG. 5*b* in the direction of a rest position shown in FIG. 5*a*. For this purpose, the spring element 37 is supported, on the one hand, on a lateral projection 38 of the release element 36 and, on the other hand, on a supporting section 39 arranged on the guide section 35. The further construction of the release element 36 and how it functions is described further below.

In addition, the locking mechanism 23 has a locking opening 45, which is formed on the shelf 9. The mode of operation of the locking opening 45 is described below.

If the rack 8 is moved from the transport position shown in FIG. 5*b* in the direction of the access position shown in FIG. 5*a*, the receiving unit 11 comes into contact with the displacement wedge shown in FIG. 1. As a result, the receiving unit 11 is displaced to the right in FIG. 5*b*. During this process, the locking element 32 slides on the shelf 9, more specifically until an enlarged end section 40 of the locking element 32 engages in the locking opening 45 on the shelf 9, this being brought about by the spring element 33, as shown in FIG. 5*a*. The enlarged end section 40 of the locking element 32 is connected to the pivot 31 via a lever section 41 of the locking element 32.

In the locked state of the rack 8 shown in FIG. 5*a*, the receiving unit 11 can no longer be moved relative to the shelf 9. Instead, the receiving unit 11 is locked in the position shown in FIG. 5*a* by the engagement of the locking element 32 in the locking opening 45. In this state, the rack 8 with the receiving units 11 can then pass a rear wall section shown in FIG. 1 without making contact.

If the rack 8 is moved from the access position shown in FIG. 5*a* back into the transport position shown in FIG. 5*b*, the release element 36 comes into contact with the displacement wedge, which for this purpose projects to a certain extent laterally into the rear loading opening of the cargo space shown in FIG. 1. This contact with the displacement wedge forces the release element 36 out of the rest position shown in FIG. 5*a* into the release position shown in FIG. 5*b*, counter to the action of the spring element 37.

At its end facing the locking element 32, the release element 36 has an actuating projection 42, which is provided with a fastening bevel 43, which faces away from the shelf 9. During the movement of the release element 36, the actuating projection 42 comes into contact with an actuating bevel 44 on the enlarged end section of the locking element 32, which bevel faces the shelf 9. As a result, the release element 36 lifts the locking element 32 and thereby pivots the locking element 32 about the pivot 31 until the enlarged end section 40 of the locking element 32 is completely disengaged from the locking opening 45. The receiving unit 11 is thereby released and can be moved by the return mechanism shown in FIGS. 3*a* and 3*b* and 4*a* and 4*b* back into the transport setting shown in FIG. 5*b*.

In an alternative, the return mechanism 22 shown in FIGS. 5*a* and 5*b* or the kinematics described above can also be reversed.

According to the disclosure, a rack system is provided having at least one receiving unit for at least partially receiving at least one cargo item which can be or is arranged in the rack, wherein the receiving unit is arranged on the shelf so as to be displaceable in a depth direction of the rack.

The features and measures presented individually in the following description can be combined with one another in any technically feasible manner and indicate further embodiments of the rack system. The description additionally characterizes and specifies the rack system, in particular in conjunction with the figures.

The rack system can be displaced by use of the receiving unit away from a cargo-space side wall arranged closest to the rack into an access setting, in which the receiving unit and/or the cargo item are/is arranged, for example, flush with a rack rear side that faces the cargo-space side wall. This displacement of the receiving unit together with the cargo item should take place in such a way that, when the rack is moved from the transport position in the direction of the access position, the access position is reached before the receiving unit and the cargo item reach a rear cargo-space wall section that laterally delimits a rear loading opening of the cargo space, thus enabling the receiving unit, which is displaced together with the cargo item, to freely pass the wall section. This enables the rack to be moved into the access position without problems, without the receiving unit or the cargo item located therein striking against the rear cargo-space wall section.

At least when the rack is in the transport setting, the receiving unit and the cargo can be displaced in the direction of the cargo-space side wall arranged closest to the rack in such a way that the receiving unit and the cargo item protrude from the rear of the rack and the receiving unit and/or the cargo item can be supported or are/is supported on this cargo-space side wall. As a result, it is possible to make efficient use of a space between the rack and the cargo-space side wall arranged closest thereto since the receiving unit and the cargo item are situated partially in this space. For this purpose, the rack is designed as a so-called open rack, which in particular does not have a continuous rear wall.

The receiving unit can also be used to receive two or more cargo items. The receiving unit can be used, for example, to receive the cargo unit in a form-fitting manner in order to prevent movement of the cargo unit relative to the receiving unit while the commercial vehicle is traveling. The receiving unit can be arranged on the shelf so as to be linearly displaceable in the depth direction of the rack by at least one displacement device. The maximum displaceability of the receiving unit can be limited mechanically in such a way that the receiving unit is arranged so as to be displaceable between two maximum settings and in one embodiment is preferably captively connected to the shelf. The rack system can also have two or more corresponding receiving units, which are arranged on the same shelf of the rack or on different shelves of the rack in a correspondingly displaceable manner.

Moving the rack at least partially out of the cargo space at the rear by use of the movement device enhances the accessibility of the rack and enables more ergonomic handling of cargo items during loading and unloading of the rack. By use of the movement device, the rack can be moved at least partially out of the cargo space of the commercial vehicle at the rear, that is to say, in particular, can be moved in the longitudinal direction of the commercial vehicle. In this case, provision can additionally be made for the movement device to be designed in such a way that, at the beginning of the movement out of the transport position, the rack is simultaneously also displaced laterally in the cargo space in the direction of a center of the cargo space, thus enabling the rack, in its transport position, to be arranged closer to the nearest cargo-space side wall, which likewise creates more space in the center of the cargo space. The movement device can have a guide unit on the floor and optionally also a guide unit on the roof, by use of which the rack can be moved in a positively guided manner. The movement device can be of purely mechanical or electromechanical design, for example. The movement device can be manually actuable or can be at least partially automated.

The rack has a rear side facing the cargo-space side wall arranged closest to the rack when the rack is in the transport position, and an access side opposite the rear side. The rack is therefore accessible from the access side, in particular within the cargo space.

The rack system can be arranged, for example, in a cargo space of a commercial vehicle in the form of a delivery vehicle or a tradesman's vehicle. To this extent, the subject matter of the disclosure also includes a correspondingly equipped commercial vehicle.

According to one advantageous embodiment, the rack system has at least one displacement wedge, which can be arranged at a fixed location on the commercial vehicle and is arranged relative to the rack in such a way that, when the rack is moved from the transport position into the access position, the receiving unit inevitably comes into contact with the displacement wedge such that the receiving unit is displaced in the direction of an access side of the rack by use of the displacement wedge. The displacement wedge is preferably arranged at a fixed location on the commercial vehicle in such a way that its wedge tip points toward the front of the commercial vehicle. The displacement wedge can be arranged within the cargo space, for example directly adjacent to the rear cargo-space wall section that laterally delimits the rear loading opening of the cargo space. During a movement of the rack in the direction of its access position, the receiving unit and/or the cargo item are/is guided along a wedge surface of the displacement wedge, as a result of which the receiving unit, together with the cargo item, is displaced or pushed in the direction of a longitudinal central axis of the commercial vehicle. According to this embodiment, the displacement of the receiving unit therefore takes place in a positive manner and at the same time during a movement of the rack in the direction of its access position, without further means in addition to the displacement wedge being used for this purpose.

According to another advantageous embodiment, the rack system has at least one return mechanism, by use of which the receiving unit which has been displaced to the access side of the rack can be subjected to a restoring force in the direction of a rear side of the rack. When the receiving unit is displaced in the direction of the access side of the rack, the return mechanism is activated or tensioned, with the result that the return device generates a restoring force by use of which the receiving unit can be pushed back into its initial position in the direction of the rear side of the rack, in particular when the receiving unit is once again completely within the cargo space when the rack is moved in the direction of its transport setting.

According to another advantageous embodiment, the return mechanism has at least one return spring, which is supported on the receiving unit, on the one hand, and on the shelf, on the other hand. When the receiving unit is displaced in the direction of the access side of the rack, the return spring is compressed or tensioned, with the result that the return spring generates a restoring force by use of which the receiving unit can be pushed back into its initial position in the direction of the rear side of the rack, in particular when the receiving unit is once again completely within the cargo space when the rack is moved in the direction of its transport setting.

According to another advantageous embodiment, the rack system has at least one locking mechanism, which can be activated by the displacement of the receiving unit to the access side of the rack and can be deactivated by the displacement of the receiving unit to the rear side of the rack. With the locking mechanism, it is possible to ensure that the receiving unit remains in its displaced position caused by the displacement wedge when the rack is in its access position. When the rack is moved into the cargo space or in the direction of its transport position, the locking mechanism is released again, thus allowing the return mechanism to push the receiving unit back into its initial position.

According to another advantageous embodiment, the locking mechanism has at least one locking element, which is preloaded in the direction of a locking position, at least one locking opening, which is formed in the shelf and in which the locking element situated in the locking position engages, and at least one release element for releasing the locking element situated in the locking position. The locking element can be arranged pivotably on the receiving unit, for example. The release element can be arranged in a linearly movable manner on the receiving unit, for example. When the locking element is in the locking position, the receiving unit is locked in its access setting on the shelf, in which the receiving unit does not protrude or protrudes only insignificantly from the rear of the rack.

According to another advantageous embodiment, the rack system has at least one electric-motor adjusting device for displacing the receiving unit relative to the shelf. For this purpose, the electric-motor adjustment device is preferably operatively connected to the displacement device. The electric motor thereof can be controlled by a control unit, for example a central control unit, or is controlled by the control unit processing the generated signals. The control unit may include process circuitry such as a microprocessor or other analog and/or digital circuitry. It is thereby possible, in particular, to displace a plurality of receiving units independently of one another and independently of the movement of the rack.

According to another advantageous embodiment, the rack system has at least one rail guide, connected to the receiving unit and the shelf, for displacing the receiving unit relative to the shelf. As a result, the receiving unit can be displaced, in particular linearly, relative to the shelf. The rack system can have a dedicated rail guide for each receiving unit or can have a common rail guide for two or more receiving units.

According to another advantageous embodiment, the receiving unit has a base, two side walls, which laterally delimit a receiving space and extend in the depth direction of the rack, and a rear wall, which connects the side walls to one another. The side walls can serve as guides for sliding the cargo item into the receiving unit. In addition, the side walls can be arranged relative to one another in such a way that a cargo item, for example in the form of a tool box, remains upright in the rack. The side walls are preferably arranged relative to one another in such a way that the cargo item accommodated in the receiving unit cannot tilt within the receiving unit.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A rack system for a cargo space of a vehicle, the rack system comprising:
    a rack;
    a shelf supported on the rack;
    a movement device for moving the rack between a transport position, in which the rack can be arranged completely in the cargo space, and an access position, in which the rack can be arranged at least partially outside the cargo space;
    a receiving unit for at least partially receiving at least one cargo item which can be arranged in the rack, wherein the receiving unit is arranged on the shelf so as to be displaceable in a depth direction of the rack; and
    a displacement wedge arranged at a fixed location on the vehicle and arranged relative to the rack such that, when the rack is moved from the transport position into the access position, the receiving unit inevitably comes into contact with the displacement wedge such that the receiving unit is displaced in a direction of an access side of the rack by the displacement wedge.

2. A rack system for a cargo space of a vehicle, the rack system comprising:
    a rack;
    a shelf supported on the rack;
    a movement device for moving the rack between a transport position, in which the rack can be arranged completely in the cargo space, and an access position, in which the rack can be arranged at least partially outside the cargo space;
    a receiving unit for at least partially receiving at least one cargo item which can be arranged in the rack, wherein the receiving unit is arranged on the shelf so as to be displaceable in a depth direction of the rack; and
    a return mechanism, for which the receiving unit which has been displaced toward the access side of the rack can be subjected to a restoring force in a direction of a rear side of the rack.

3. The rack system according to claim 2, wherein the return mechanism has at least one return spring, which is supported on the receiving unit and on the shelf.

4. A rack system for a cargo space of a vehicle, the rack system comprising:
    a rack;
    a shelf supported on the rack;
    a movement device for moving the rack between a transport position, in which the rack can be arranged completely in the cargo space, and an access position, in which the rack can be arranged at least partially outside the cargo space;
    a receiving unit for at least partially receiving at least one cargo item which can be arranged in the rack, wherein the receiving unit is arranged on the shelf so as to be displaceable in a depth direction of the rack; and
    a locking mechanism, which is activated by the displacement of the receiving unit to the access side of the rack and deactivated by the displacement of the receiving unit to the rear side of the rack.

5. The rack system according to claim 4, wherein the locking mechanism has a locking element, which is preloaded in the direction of a locking position, a locking opening, which is formed in the shelf and in which the locking element situated in the locking position engages, and a release element for releasing the locking element situated in the locking position.

6. The rack system according to claim 1, further comprising a rail guide, connected to the receiving unit and the shelf, for displacing the receiving unit relative to the shelf.

7. The rack system according to claim 1, wherein the receiving unit has a base, two side walls, which laterally delimit a receiving space and extend in the depth direction of the rack, and a rear wall, which connects the side walls to one another.

8. The rack system according to claim 1, further comprising an electric-motor adjusting device for displacing the receiving unit relative to the shelf.

9. The rack system according to claim 1, wherein the rack system is for the cargo space on a commercial vehicle.

10. A rack system for a cargo space of a commercial vehicle, the rack system comprising:
    a rack;
    a shelf supported on the rack;
    a movement device for moving the rack between a transport position, in which the rack can be arranged completely in the cargo space, and an access position, in which the rack can be arranged at least partially outside the cargo space;

a receiving unit for at least partially receiving at least one cargo item which can be arranged in the rack, wherein the receiving unit is arranged on the shelf so as to be displaceable in a depth direction of the rack;

a displacement wedge arranged at a fixed location on the commercial vehicle and arranged relative to the rack such that, when the rack is moved from the transport position into the access position, the receiving unit inevitably comes into contact with the displacement wedge such that the receiving unit is displaced in a direction of an access side of the rack by the displacement wedge; and a return mechanism, for which the receiving unit which has been displaced toward the access side of the rack can be subjected to a restoring force in a direction of a rear side of the rack.

11. The rack system according to claim 10, wherein the return mechanism has at least one return spring, which is supported on the receiving unit and on the shelf.

12. The rack system according to claim 10, further comprising a locking mechanism, which is activated by the displacement of the receiving unit to the access side of the rack and deactivated by the displacement of the receiving unit to the rear side of the rack.

13. The rack system according to claim 12, wherein the locking mechanism has a locking element, which is preloaded in the direction of a locking position, a locking opening, which is formed in the shelf and in which the locking element situated in the locking position engages, and a release element for releasing the locking element situated in the locking position.

14. The rack system according to claim 10, further comprising a rail guide, connected to the receiving unit and the shelf, for displacing the receiving unit relative to the shelf.

15. The rack system according to claim 10, wherein the receiving unit has a base, two side walls, which laterally delimit a receiving space and extend in the depth direction of the rack, and a rear wall, which connects the side walls to one another.

16. The rack system according to claim 10, further comprising an electric-motor adjusting device for displacing the receiving unit relative to the shelf.

17. A rack system for a cargo space of a vehicle, the rack system comprising:

a rack;

a shelf supported on the rack;

a movement device for moving the rack between a transport position, in which the rack can be arranged completely in the cargo space, and an access position, in which the rack can be arranged at least partially outside the cargo space;

a receiving unit for at least partially receiving at least one cargo item which can be arranged in the rack, wherein the receiving unit is arranged on the shelf so as to be displaceable in a depth direction of the rack; and a rail guide, connected to the receiving unit and the shelf, for displacing the receiving unit relative to the shelf.

18. A rack system for a cargo space of a vehicle, the rack system comprising:

a rack;

a shelf supported on the rack;

a movement device for moving the rack between a transport position, in which the rack can be arranged completely in the cargo space, and an access position, in which the rack can be arranged at least partially outside the cargo space;

a receiving unit for at least partially receiving at least one cargo item which can be arranged in the rack, wherein the receiving unit is arranged on the shelf so as to be displaceable in a depth direction of the rack; and an electric-motor adjusting device for displacing the receiving unit relative to the shelf.

* * * * *